United States Patent
Baker et al.

(10) Patent No.: US 9,369,861 B2
(45) Date of Patent: Jun. 14, 2016

(54) CONTROLLING BEHAVIOR OF MOBILE DEVICES USING CONSENSUS

(75) Inventors: Mary G Baker, Palo Alto, CA (US); Daniel George Gelb, Redwood City, CA (US); Ian N Robinson, Pebble Beach, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/389,506

(22) PCT Filed: Apr. 30, 2012

(86) PCT No.: PCT/US2012/035821
§ 371 (c)(1),
(2), (4) Date: Sep. 30, 2014

(87) PCT Pub. No.: WO2013/165355
PCT Pub. Date: Nov. 7, 2013

(65) Prior Publication Data
US 2015/0079962 A1    Mar. 19, 2015

(51) Int. Cl.
| | |
|---|---|
| *H04M 1/00* | (2006.01) |
| *H04W 8/18* | (2009.01) |
| *H04W 4/02* | (2009.01) |
| *H04W 64/00* | (2009.01) |
| *H04M 1/725* | (2006.01) |
| *H04W 4/04* | (2009.01) |

(52) U.S. Cl.
CPC ............... *H04W 8/18* (2013.01); *H04W 4/023* (2013.01); *H04M 1/7253* (2013.01); *H04M 1/72569* (2013.01); *H04M 1/72572* (2013.01); *H04M 1/72577* (2013.01); *H04M 2250/12* (2013.01); *H04W 4/043* (2013.01); *H04W 64/00* (2013.01)

(58) Field of Classification Search
CPC ....... H04W 8/18; H04W 4/023; H04W 4/043; H04W 64/00; H04M 1/72577; H04M 2250/12; H04M 1/7253; H04M 1/72572; H04M 1/72569
USPC ..................................................... 455/567
See application file for complete search history.

(56) References Cited

U.S. PATENT DOCUMENTS

| | | |
|---|---|---|
| 6,748,195 B1 | 6/2004 | Phillips |
| 7,359,714 B2 | 4/2008 | Parupudi et al. |
| 2008/0005679 A1 | 1/2008 | Rimas-Ribikauskas et al. |
| 2009/0029681 A1* | 1/2009 | Clemow et al. ............ 455/412.2 |
| 2009/0088221 A1 | 4/2009 | Gilbert et al. |
| 2009/0124241 A1* | 5/2009 | Krishnaswamy et al. . 455/414.2 |

(Continued)

FOREIGN PATENT DOCUMENTS

| | | |
|---|---|---|
| EP | 2264988 | 12/2010 |
| EP | 2302882 | 3/2011 |
| WO | WO-2008002385 | 1/2008 |

OTHER PUBLICATIONS

Christoph, U. et al., Context Detection on Mobile Devices, Workshop on Context-Systems Design, Evaluation and Optimisation, 2011, Como, Italy.

(Continued)

*Primary Examiner* — Martin Mushambo
(74) *Attorney, Agent, or Firm* — Dickinson Wright PLLC.

(57) ABSTRACT

A method of determining context-appropriate behavior for mobile devices.

20 Claims, 7 Drawing Sheets

(56) References Cited

U.S. PATENT DOCUMENTS

| | | |
|---|---|---|
| 2009/0170552 A1 | 7/2009 | Lin |
| 2009/0239508 A1 | 9/2009 | Waddell |
| 2010/0306138 A1* | 12/2010 | Hotes ................ G06Q 30/0206 |
| | | 706/12 |
| 2010/0317371 A1 | 12/2010 | Westerinen et al. |
| 2012/0059780 A1 | 3/2012 | Kononen et al. |

OTHER PUBLICATIONS

International Search Report and Written Opinion, Korean Intellectual Property Office, Nov. 28, 2012. Hewlett-Packard Development Company, L.P., PCT Application No. PCT/US2012/035821.

European Search Report, Hewlett-Packard Development Company, EP Patent Application No. 12875888.5, Report issued Mar. 25, 2015.

\* cited by examiner

CONTROLLING BEHAVIOR OF MOBILE DEVICES USING CONSENSUS

CROSS-REFERENCE TO RELATED APPLICATION

This application is a U.S. National Stage Application of and claims priority to International Patent Application No. PCT/US2012/035821, filed on Apr. 30, 2012, and entitled "CONTROLLING BEHAVIOR OF MOBILE DEVICES."

BACKGROUND

In a variety of social settings, including, entertainment venues, hospitals, cars, schools, and other locations, humans have developed expected social etiquette. This social etiquette generally includes various customs and manners that are tailored to reduce the likelihood of offending or disturbing others and thereby improve the ability of people to peacefully coexist. For example, it is generally undesirable for a person or a device of that person to make a loud noise during the middle of certain entertainment venues, such as movies or fine art performances. As various mobile devices have become more compact and ubiquitous for people to carry, incidents involving mobile devices being intrusive upon other people have increased.

BRIEF DESCRIPTION OF THE DRAWINGS

The detailed description will refer to the following Figures in which like numerals refer to like items, and in which.

DETAILED DESCRIPTION

Figure 1:
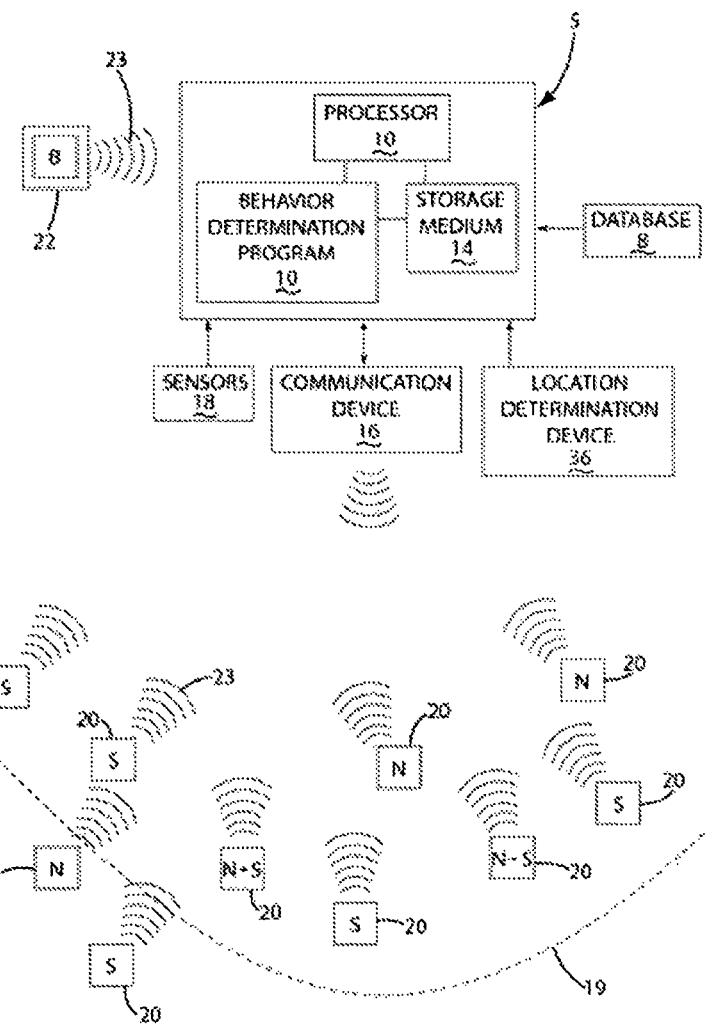
FIG. 1 illustrates a system having a mobile device in communication with other mobile devices, each having a current behavior profile or a recent change in behavior profile.

As mobile devices become compact with ever-increasing functionality, they have increased in popularity such that the substantial majority of people in most locations or social settings are carrying some form of a mobile device. With the increasing prevalence of mobile devices, there has also been an increasing prevalence of people being offended by other people's mobile device etiquette or even the mobile device owner being embarrassed by forgetting to make the mobile device behave appropriately for the current situation, social setting, or location.

The method as described below provides an easy, efficient and substantially automated or auto prompting process to ensure that each mobile device has context-appropriate behavior for the situation, location, or social setting. For example, in attending a movie or fine art performance, where it is desirable for the audience to generally be quiet, it is context-appropriate behavior for a mobile device, such as a phone, to be silent so as to not disturb the enjoyment of others in the audience. More specifically, it is typically expected and requested in the above-described situations for the members of the audience to silence mobile phones, pagers, and any other device carried by an audience member. When one member of the audience forgets to silence their mobile device in the above-described situations, it is generally to the annoyance of the other members of the audience as well as typically to the embarrassment of the owner of the mobile device. Even when specific requests are made to silent mobile devices before the start of a performance, it is commonplace for one member of the audience to forget to turn off or place their mobile device into a context-appropriate behavior, such as a silent profile. The method as described below provides an efficient method for automatically changing or auto prompting the user to change the profiles or behavior of mobile devices to be context appropriate to the situation. The method also provides the ability for the mobile device to be automatically returned or to automatically prompt the user to return the mobile device to the desired settings when the situation that required a change in context-appropriate behavior has ended.

The principles are discussed herein with respect to example processes, methods, system, and apparatus, and with reference to various diagrams. The examples are shown and described as a series of blocks, but are not limited by this depiction, as the actions, steps, concepts, and principles associated with the illustrated blocks may occur in different orders than as described, and/or concurrently, and fewer or more than the illustrated number of blocks may be used to implement an example method. Blocks may be combined or include multiple components or steps.

The functional units described herein as steps, methods, processes, systems, subsystems, routines, modules, and so forth, may be implemented by a processor or processors executing software. Executable code may include physical and/or logical blocks of computer instructions that may be organized as a procedure, function, and so forth. The executables associated with an identified process or method need not be physically collocated, but may include disparate instructions stored in different locations which, when joined together, collectively perform the method and/or achieve the purpose thereof. Executable code may be a single instruction or many, may be distributed across several different code segments, among different programs, across several memory devices, and so forth. Methods may be implemented on a computer, with the term "computer" referring herein to a computer or computers and/or a computer network, or otherwise in hardware, a combination of hardware and software, and so forth.

As used herein, the term "context" may depend on many different items or situations including, time of day, location, others in the vicinity, current intention of the people in the vicinity, the activity currently being engaged in, social situation, or day of the week. Therefore, in this application as the word "context" is used, it refers to any type of location, situation or any other setting where it may be desirable for mobile devices to have desired behaviors. As briefly illustrated above, one context-appropriate behavior may be the silencing of the mobile device for contexts where it is desirable for silence, while other context-appropriate behavior may be to increase the volume of alerts automatically in other contexts. The actual type of context-appropriate behavior may vary widely depending upon the context the type of mobile device and the preferences of the user, and the method as described below may easily accommodate and adjust for a new context or new context-appropriate behavior as it becomes available. Examples of mobile devices in which behavior may be controlled generally include mobile phones, cameras, portable or mobile projection devices, laptop or portable computers, tablets, gps devices, electronic sports equipment, e-readers and wearable electronic devices, such as watches, electronic glasses, and integrated controllable clothing and footwear, such as LED footwear.

In general, the method may be used to prevent or control certain notifications or other behavior that may be noticed by others. Examples of context-appropriate behavior may include limiting the playing of certain ringtones when minors are present, changing an initial profile to silent or from silent back to the initial profile, controlling brightness of lights, changing the mobile device to be in an airplane mode, and adjusting the volume of notification such as a mobile phone ringing or notifying the arrival of a text message. Other examples of behavior on electronic devices that may be controlled to be context-appropriate behavior may include playing music, alarms, limiting the use of the camera in certain situations, limiting the use of flash on a camera, such as in museums, and generally controlling the brightness, on/off status, and blinking of LED lights, pinhole lights, screens or other displays.

The method may be implemented on the mobile device through built-in software or an added application. The method may also be implemented at least in part remotely from the device. For example, the determination of context-appropriate behavior, as well as other steps may occur remote from the device, such as on remote servers or the cloud. The method may allow for automatic change in the behavior of the mobile device to be context appropriate. The method may also provide prompts by the mobile device for the user to approve a proposed behavior change before changing behavior of the mobile device. The method may use a variety of inputs to receive data regarding context-appropriate behavior.

One method of determining the context-appropriate behavior for a mobile device is to view the behavior status or profiles of other mobile devices 20 within a specified range. As illustrated in FIG. 1, the mobile device 5 may include a processor 10, behavior determination program 12 having instructions stored on a computer readable storage medium 14 to determine the desired behavior of a mobile device 5 in various situations. As described above, and in further detail below, the behavior determination program may reside remotely, such as on the cloud, remote servers, or other remote electronic devices. The mobile device 5 may include or be in communication with sensors 18, a communication device 16 and a location determination device, as further described below. Generally, the sensors 18 may be any sensors desired by the method, such as light sensors, microphones, accelerometers and more. The communication device 16 may be any device capable of wirelessly communicating with other mobile devices 20. In FIG. 1, the other mobile devices 20 are illustrated as having a silent "S" or a normal "N" profile as well as some devices having a recent profile change from normal to silent "N→S". The status or profiles of the other mobile devices 20 may be used to determine context-appropriate behavior for the mobile device 5. To avoid privacy concerns, communication between the devices 5 and 20 may be limited to only their current behavior or specified profile selections, and not include any personally identifiable data. A user of a mobile device 5 could also limit sharing of the behavior profile or turn off sharing, for example, only provide the behavior profile when a mobile phone has a silent profile active and it is advantageous for the user's enjoyment of the current content to also have other devices 20 in silent mode.

As each mobile device 5 reads the behavior of at least a sampling of other mobile devices 20 in the vicinity, the mobile device 5 may determine a consensus about appropriate behavior. If the mobile device 5 determines a consensus regarding context-appropriate behavior, the mobile device 5 may automatically change its current behavior to match the determined context-appropriate behavior. The determination of a consensus may include a variety of factors which may be predetermined or set by the user. For example, it may be desirable to limit the other mobile devices 20 being considered in determining context-appropriate behavior to those within a specified proximity range as illustrated by the dashed line 19 in FIG. 1. More specifically, in determining a consensus of mobile devices in a movie theatre, the maximum desired range may be 50-100 feet, to avoid including devices in the lobby, which would have a different context, and therefore different context-appropriate behavior. The proximity may be set by determining the strength of the signals of other mobile devices 20 broadcasting context-appropriate behavior and their rejecting any devices 20 that fall below a certain specified signal strength. Any method of determining proximity to other mobile or electronic devices may be used, including sound or other visual inputs on the mobile devices.

The mobile device 5 may also, instead of determining a consensus of current behavior of other mobile devices, determine a consensus of recent behavior or status changes in other mobile devices, as illustrated in FIG. 1 by the N→S on the devices 20. Of course, the mobile device 5 may consider both the consensus regarding current behavior of other mobile devices 20, as well as a consensus of recent changes in the behavior of other mobile devices 20. Each of these inputs may be weighted differently in determining context-appropriate behavior of the subject mobile device 5. In some circumstances, viewing recent changes in behavior of other mobile devices 20 may provide a better indication of context-appropriate behavior for a mobile device 5 than current behavior profiles. More specifically, as a user manually changes their mobile device 5 profile such as from normal to silent, this change in profile may provide a better indication of desired behavior than a consensus between other mobile devices 20. More specifically, if a number of people in the vicinity forget to change the behavior of the mobile device 20, the determined consensus may be that no change is needed in the behavior of the subject mobile device 5, but if only a few people changed the behavior of their mobile devices 20, even though they are in the minority of the other mobile devices 20 the subject mobile device 5 may determine that a change in behavior is needed. Therefore, greater weight may be given to a manually initiated change in the behavior profile of a mobile device 5 as compared to the current context-appropriate behavior of multiple mobile devices 20 in the vicinity.

The number of mobile devices 20 required to have a consensus regarding current behavior or recent initiated changes in behavior may be easily set by the manufacturer of the mobile device 5, network carrier, software such as apps loaded on the mobile device 5, and the user. The actual number may not be specified, but instead may be determined based upon the number of mobile devices 20 in the vicinity and that a sufficient number of the total have a consensus in behavior or have had a recent change in behavior. As a change of behavior is often manually initiated by at least one user, such a change may be given greater weight than the current behavior of the surrounding devices 20. A change in behavior that is manually initiated may be specifically identified and communicated to other mobile devices, and as such be given greater weight in determining context-appropriate behavior by the other devices. The method in looking at a swarm of proximate devices to determine current behavior or changes in behavior works well in group audiences such as movie theatres, fine art performances, religious services, funerals, public presentations, classrooms, public dinners, restaurants, and a variety of other settings where groups of people gather. As stated above, the method may also use a combination of determining a consensus of the current behavior of the proximate mobile devices 20 as well as determining recent changes in the behavior of proximate mobile devices. Using both the current behavior as well as recent changes in behavior may also prevent errors in determining context-appropriate behavior. For example, the users of mobile phones enjoying a fine arts performance have a context-appropriate behavior of silent for the mobile device. If one or more members of the audience leave and change the behavior of the mobile device from silent to normal, if only changes in behavior are considered, and the change meets all other criteria, the mobile devices that are proximate may also change their behavior, causing a ripple effect through the audience. If both current behavior and recent changes are considered, the mobile devices in the vicinity may see the change from silent to normal and then determine the behavior other devices around in the vicinity to determine that the consensus is still a silent profile and therefore no change should be made. As such, the mobile device 5 will not automatically change its current behavior of silent. In addition, a mobile device may, in determining context-appropriate behavior, use an additional input of the time of day, day of the week, or other date related inputs that do not require access to an external database. The use of the time of day, or day of the week, may be set by the user to have context-appropriate behavior for situations commonly encountered by the user.

Figure 2:
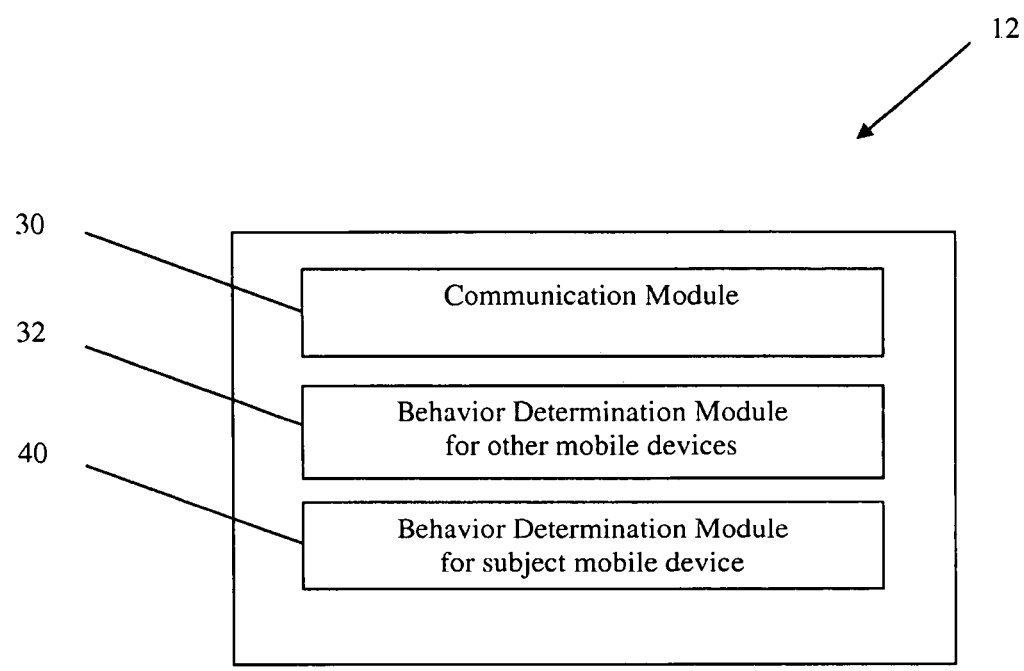
FIG. 2 illustrates a block diagram of an example of modules used to determine behavior of a mobile device.
Figure 5:
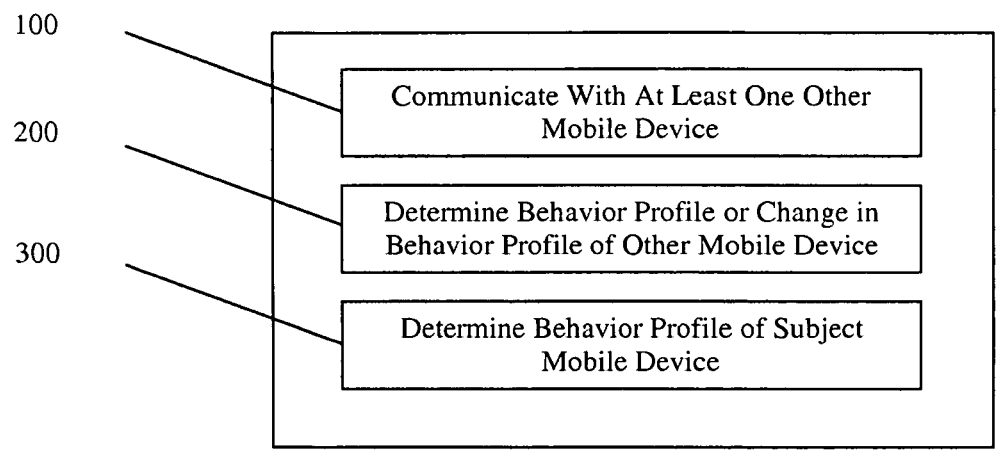
FIG. 5 illustrates a block diagram of an example of the method of determining behavior of a mobile device.

FIG. 2 generally illustrates modules of the program 12 discussed above to determine behavior of the mobile device 5. As illustrated in FIG. 2, a communication module 30, a behavior determination module for other mobile devices 32 and a behavior determination module for the subject mobile device. FIG. 5 illustrates an example of the method described above, including a communicate with at least one other mobile device block 100, determine behavior profile of at least one other mobile device block 200 and determine behavior profile of subject mobile device block 300.

Mobile devices may use, instead of or in combination with the above described consensus or change in profile behavior of other mobile devices, the current location of the subject mobile device to determine a behavior profile. The current location may be determined through any known method. For example, the locating of the mobile device may be network based, mobile device based, SIM based or some combination thereof. These location methods are directed to a geographic location of the mobile device and then using that geographic location, in determining context-appropriate behavior. As described below, other types of location methods may be used individually or in combination with a geographic location. A geographic location, may also be a geographic location within a building, such as within a certain room within a building.

Once the geographic location is determined, the mobile device 5 may access a database 18 locally or through a network which includes suggested context-appropriate behavior for the mobile device 5 at that location. The database 8 may be created by a third party, the user by inputting desired profiles, or by a community of users each inputting profiles desired at certain geographic locations. The mobile device 5 may change its behavior to match the context-appropriate behavior suggested by the database 8. Of course, the mobile device 5 may be used in connection with the consensus method described above and before changing to the database 8 suggested context-appropriate behavior, the mobile device 5 may poll other mobile devices 20 for a consensus or look for changes in the profile of various mobile devices 20 to make a further determination to match or ignore the proposed database location based context-appropriate behavior. For example, in an entertainment venue such as an outdoor venue, which hosts many different activities, a location-based context-appropriate behavior may be indeterminate as that location may have different acceptable profiles depending upon the current venue. Of course, the database 8 may also include the type of venue on a particular day and time such that in combination with the time and day or other desired information, the context-appropriate based behavior based upon location may be accurately determined in almost any situation. Even if the location-based context-appropriate behavior is determined, it may be desirable to poll all devices 20 in the vicinity, in order to determine what changes other users have actively made or allowed, before performing an automatic change based upon location based context-appropriate behavior. For example, in an outdoor symphony performance that may otherwise house rock concerts, sporting events and other venues, the location-based context profile may be indeterminate or even if updated with other information to improve accuracy. If the current time is slightly before the start of the outdoor symphony, while the database location-based context-appropriate behavior specifically states that a change in behavior should be made, by polling the other devices in the vicinity for consensus on behavior or looking for recent changes in the behavior profile of mobile devices, the mobile device may determine that currently no change is needed and then later change the profile as other mobile devices change their behavior closer to start of the venue.

Figure 3:
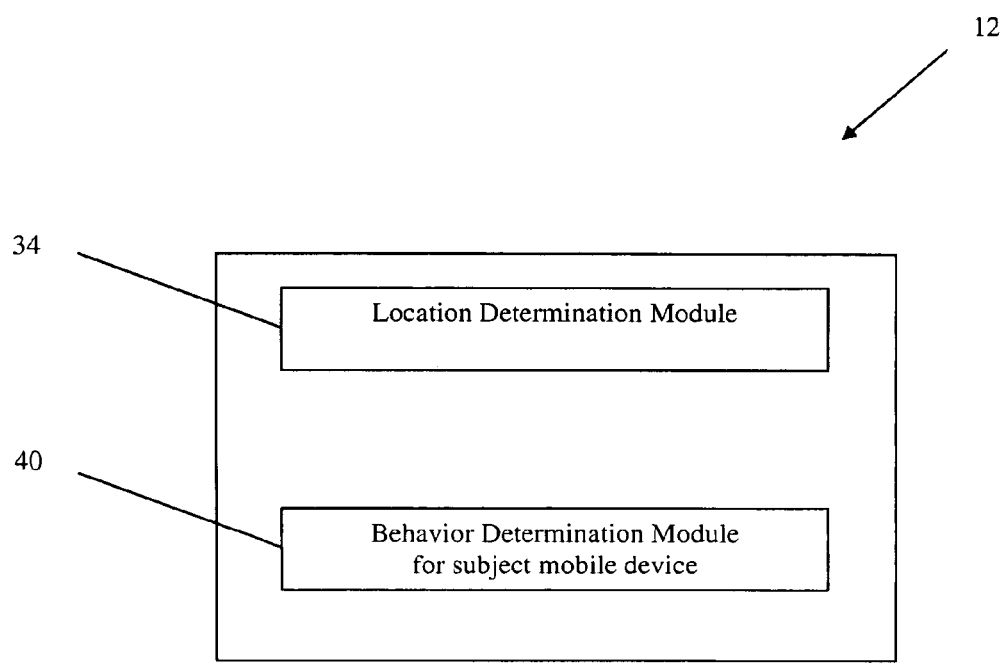
FIG. 3 illustrates a block diagram of an example of modules used to determine behavior of a mobile device.
Figure 6:
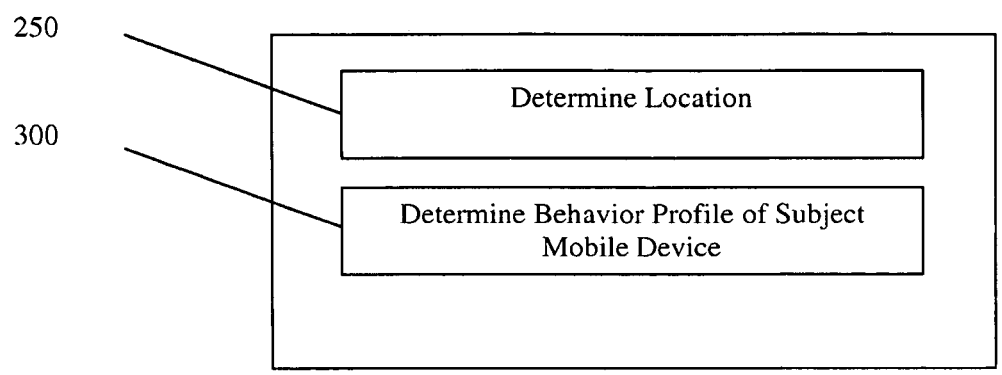
FIG. 6 illustrates a block diagram of an example of the method of determining behavior of a mobile device.

As illustrated in FIG. 3, for the above-described method, the program 12 may include a location determination module 34 and a behavior determination module for the subject device 40. These modules 34 and 40 may be used in connection with the other described modules. As further illustrated in FIG. 6, the method may include a determine location block 250 and a determine behavior profile of the subject matter device 300.

Instead of the geographic location determination, location-based context may also use an external actuator provided by the venue or facility, such as a beacon 22, to notify mobile devices of the desired behavior. The external device or beacon may be set up in hospitals, symphony halls, opera houses, movie theatres or other areas where it is appropriate to control the behavior profile of the mobile device 5. The external device or beacon 22 may broadcast a signal 23 that provides the desired behavior profile to the mobile devices 5. The mobile device 5 reads the desired behavior profile and prompts the user or automatically changes the behavior profile of the mobile device 5. These external beacons 22 may be particularly relevant in hospitals where the beacon 22 automatically forces the mobile device 5 into an airplane mode setting wherein the external radios of the mobile device 5 are turned off and may be used in only selected areas of the hospital. For example, doorways to wireless free zones may include a beacon and when passing through the doorway, the mobile device shuts off all wireless signals. Similarly, the beacon 22 could notify the device as the user exits, such as after a specified time period has passed, that it is acceptable to turn on wireless signals. The user may also program desired behavior based upon the external actuator or beacon 22. For example, while a beacon 22 broadcasts a desired silent profile, the user may set the mobile device 5 to always default to a vibrate profile instead, or just when that specific beacon 22 is present.

The location-based context may also be programmed by the user and use any of the above locating methods to determine the location. In addition, the method allows the mobile device 5 to determine relative location proximate to surrounding localized cues at a desired location. More specifically, if the user of a mobile device 5 frequently attends a particular location such as a classroom, where it is desirable for the mobile device to have a silent profile, the user may specifically program the profile change to occur automatically the next time that the user is in the location. Therefore, the user only needs to change the profile one time at that location and the mobile device 5 would automatically return to the desired profile behaviors at that location. The user may also program the mobile device 5 change behavior when the mobile device 5 is displaced a certain distance away from the desired location or when certain external cues are not prevalent. More specifically, in the example of a classroom situation described above, instead of or in combination with the geographic cues, the mobile device may search for other electronic devices in particular wireless signals 23 emitted by the other devices nearby and use those to determine a location. As described above, that location may be used to determine a desired profile from a database, and initiate a change in behavior of the mobile device 5. This may be done irrespective of a GPS location or other network location commonly used by mobile devices. One advantage to using surrounding electronic devices such as other mobile devices 20 in the vicinity is that in the above classroom example, as a user moves from classroom to classroom, the geographic location may change, but if some of the mobile devices 20 overlap, the mobile device 5 would stay in the desired behavioral profile because of its vicinity to the same other mobile devices 20. More specifically, if a user programs in a first classroom to have a silent profile, when leaving the classroom it may return to a normal profile but upon entering another classroom where there is overlap of mobile devices 20 in the vicinity, it may identify the current location as a classroom setting or other venue where it is desirable to perform a profile change from normal back to silent. Therefore, the mobile device 5 may look for external cues to determine relative location proximate to external cues, other than, or in combination with, geographic location to automatically change or prompt the user to change the profile.

In combination with the above-described methods or separately, the mobile device 5 may use certain environmental cues to prompt for a change in behavior or automatically change the profile behavior of the mobile device 5 to be a context-appropriate behavior. More specifically, the method allows the mobile device 5 through various sensors 18 such as related sound and light to determine the desired behavior. For example, the mobile device 5 upon hearing the introduction played in a movie theatre, such as the THX surround sound before the start of a movie, the mobile device 5 would identify the played audio stream and fingerprint it as requiring a behavior profile change, such as to a silent behavior profile. Likewise, the sound of a crowd leaving after the movie could be used to change the profile of the mobile device from silent to normal. Existing microphones built-in to the mobile device, such as a mobile phone may be used. While the environmental actuator method may act solely without reference to other methods of determining context-appropriate behavior, it is useful in combination with the other above-described methods. More specifically, through a consensus, change in profiles or location-based behavioral context may be determined but the mobile device may not actually change its behavior profile until certain environmental cues occur. Therefore, in the example where a mobile phone is in a movie theatre, all of the other above-described methods for determining context-appropriate behavior through location or operation of other devices may show a desired change in the profile from normal to silent but the environmental actuator may prevent the profile change from occurring until environmental cues of the movie starting occur are determined. Any types of desired sound may be recorded or fingerprinted to change the desired profile. One benefit of using the environmental actuator in combination with other methods of determining context-appropriate behavior, as described above, is that if the mobile device 5 is instead of a movie theatre located in a home environment at the start of the movie, the same sounds may play and be fingerprinted as requiring a change in behavior. Use of the location based methods in combination or simply requiring a prompt to the user in place of automatic changes prevent errors. Therefore, the environmental actuator when used in combination with the other described methods of determining context-appropriate behavior allows the mobile device to more accurately determine context-appropriate behavior, and make fewer mistakes if automatically changing or the prompting the user for changes in behavior.

Figure 4:
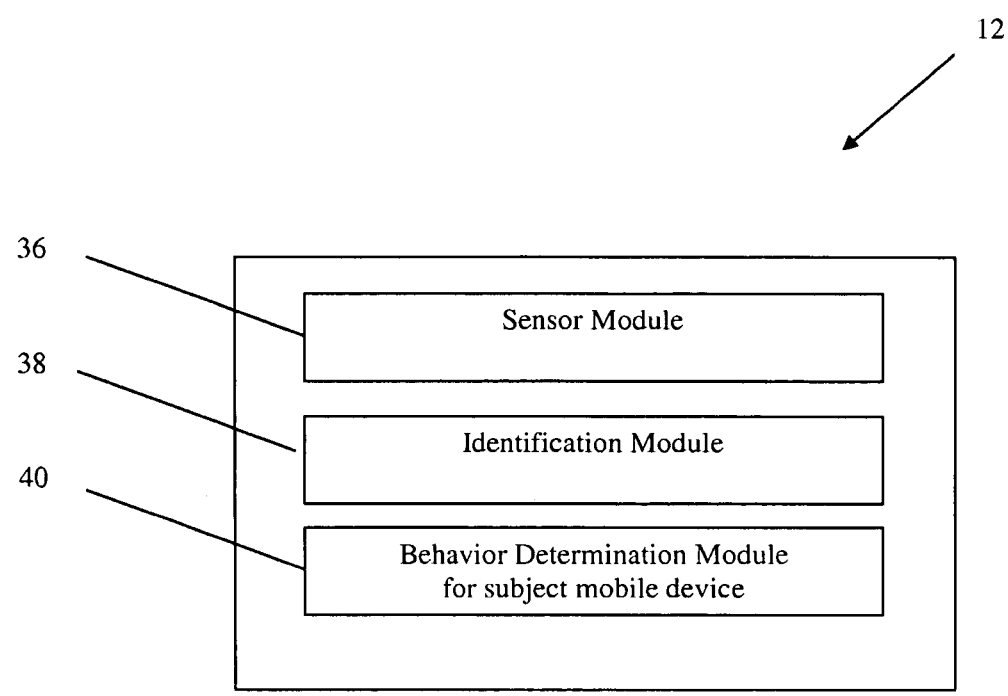
FIG. 4 illustrates a block diagram of an example of modules used to determine behavior of a mobile device.
Figure 7:
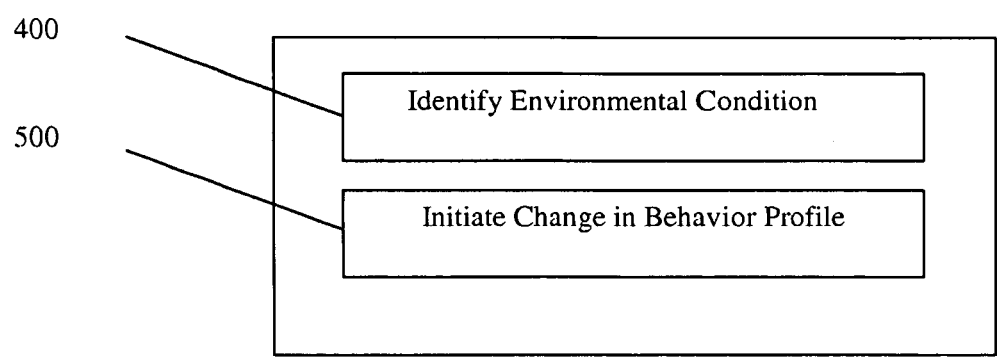
FIG. 7 illustrates a block diagram of an example of the method of determining behavior of a mobile device.

As illustrated in FIG. 4, the program 12 may include a sensor module 36, an identification module 38 and the behavior determination module 40. All of these modules 36, 38 and 40 may be used in combination with the other above described modules. As further illustrated in FIG. 7, the method includes an identity environmental condition block 400 and an infinite change in behavior profile block 500.

We claim:

1. A method of controlling behavior of a mobile device comprising:
   communicating with at least one-other mobile device in a set number of other mobile devices;
   determining at least one of a current behavior profile or a recent change in behavior profile of the at least one other mobile device, further including determining a consensus about appropriate behavior with at least the set number of other mobile devices within a specified range determined by the strength of signals of the set number of other mobile devices and rejecting any at least one other mobile device that falls below a specified signal strength; and
   determining a behavior profile of the mobile device based upon the determined at least one of a current behavior profile or a recent change in behavior profile of the at least one other mobile device.

2. The method of claim 1 wherein communicating with at least one other mobile device is limited to only the current behavior profile or recent change in behavior profile and does not include any personally identifiable data.

3. The method of claim 1 further including the step of changing the current behavior profile of the mobile device to match the determined behavior profile of the mobile device.

4. The method of claim 1 further including determining the location of the mobile device and accessing behavior instructions for the determined location and using the behavior instructions to confirm the determined behavior profile of the mobile device is correct.

5. The method of claim 1 wherein in determining a behavior profile of the mobile device based upon the determined at least one of a current behavior profile or a recent change in behavior profile of the at least one other mobile device, the set number of other mobile devices to be considered in determining the behavior profile of the mobile device, are limited to a specified proximity.

6. The method of claim 1, further comprising:
determining a location of the mobile device;
wherein determining the behavior profile of the mobile device is further based upon the determined location of the mobile device.

7. The method of claim 6 wherein determining the location of the mobile device includes determining the proximity of wireless signals of other electronic devices.

8. The method of claim 6 wherein determining the location of the mobile device includes determining the proximity of other electronic devices through sound or visual inputs.

9. The method of claim 7 further including setting a desired profile by the user of the mobile device and instructing the mobile device to determine wireless devices proximate to the mobile device.

10. The method of claim 9 further including initiation of an automatic behavior profile change or a prompt for a behavior profile change when at least a specified percentage of the determined wireless devices are proximate to the mobile device.

11. The method of claim 6 wherein determining the location includes determining the geographic location.

12. The method of claim 6 wherein determining the location of the mobile device includes determining the location of the mobile device proximate to a beacon and wherein the beacon provides a desired behavior profile to mobile devices.

13. The method of claim 12 wherein the provided desired behavior profile is used in determining the behavior profile of the mobile device.

14. The method of claim 1 further comprising:
using a sensor on the mobile device to identify a specified environmental condition;
wherein determining the behavior profile of the mobile device is further based on the identified specified environmental condition.

15. The method of claim 14 the sensor is a microphone and the specified condition is a sound profile.

16. The method of claim 1 wherein determining a behavior profile of the mobile device includes a weighted combination of consensus regarding current behavior of the set number of other mobile devices and a consensus of recent changes in behavior of the set number of other mobile devices.

17. A non-transitory computer readable medium for controlling behavior of a mobile device, the medium comprising instructions that when read by a processor cause the processor to:
communicate with at least one other mobile device in a set number of other mobile devices;
determine at least one of a current behavior profile or a recent change in behavior profile of the at least one other mobile device, further including determining a consensus about appropriate behavior with at least the set number of other mobile devices within a specified range determined by the strength of signals of the set number of other mobile devices and rejecting any at least one other mobile device that falls below a specified signal strength; and
determine a behavior profile of the mobile device based upon the determined at least one of a current behavior profile or a recent change in behavior profile of the at least one other mobile device.

18. The non-transitory computer readable medium of claim 17, wherein to communicate with at least one other mobile device is limited to only the current behavior profile or recent change in behavior profile and does not include any personally identifiable data.

19. A non-transitory computer readable medium for controlling behavior of a mobile device, the medium comprising instructions that when read by a processor cause the processor to:
communicate with at least one other mobile device in a set number of other mobile devices;
determine at least one of a current behavior profile or a recent change in behavior profile of the at least one other mobile device including determining a consensus about appropriate behavior with at least the set number of other mobile devices; and
determine a behavior profile of the mobile device based upon the determined at least one of a current behavior profile or a recent change in behavior profile of the at least one other mobile device, wherein to determine a behavior profile of the mobile device includes a weighted combination of consensus regarding current behavior of the set number of other mobile devices and a consensus of recent changes in behavior of the set number of other mobile devices.

20. The non-transitory computer readable medium of claim 19 wherein a greater weight is given to manually initiated change in the behavior profile to the mobile device as compared to a current context-appropriate behavior of the set number of other mobile devices.

* * * * *